Patented Apr. 9, 1940

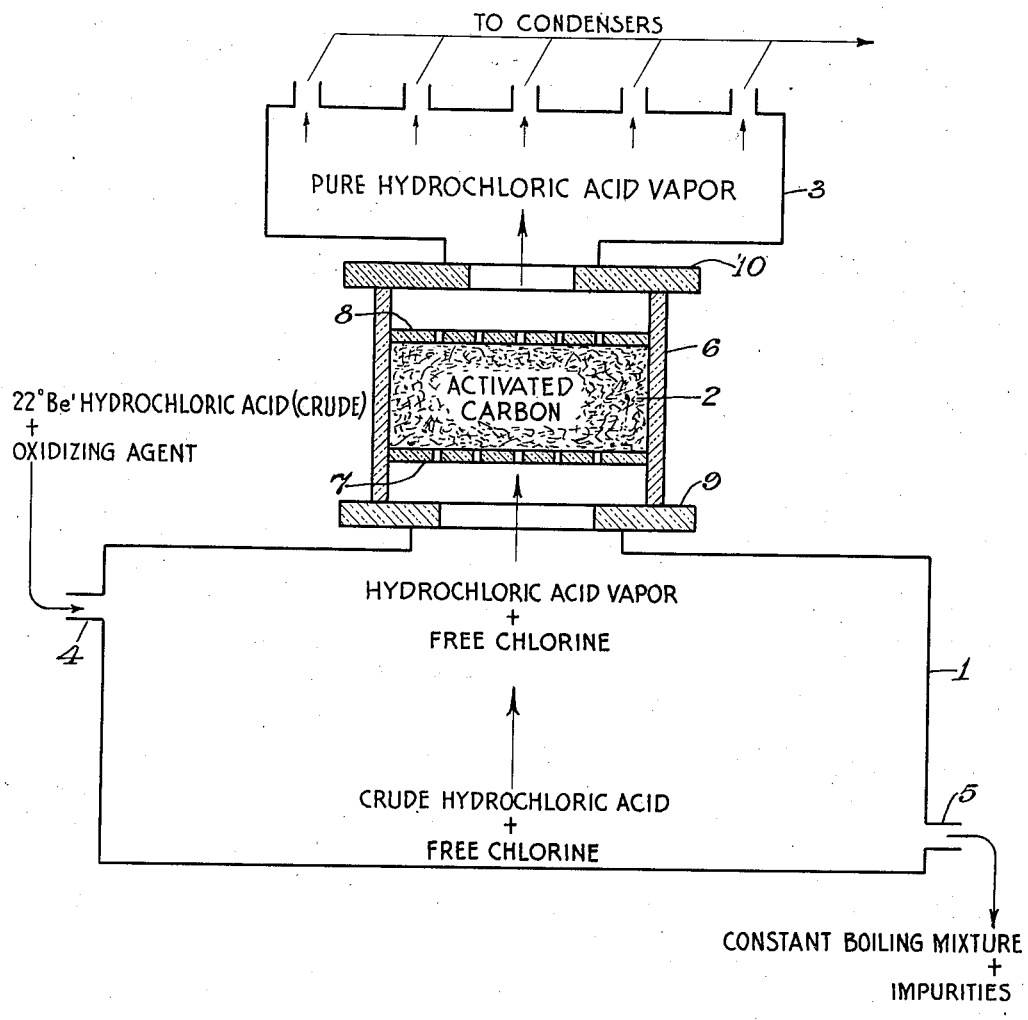

2,196,246

UNITED STATES PATENT OFFICE 2,196,246

MANUFACTURE OF CHEMICALLY PURE HYDROCHLORIC ACID

James W. Brown and Donald P. Hill, Hammond, Ind., assignors to E. I. du Pont de Nemours & Company, Wilmington, Del., a corporation of Delaware Application April 16, 1937, Serial No. 137,290

5 Claims. (Cl. 23—154)

This invention relates to the manufacture of chemically pure hydrochloric acid and is particularly directed to processes for purifying crude hydrochloric acid wherein arsenical and organic impurities are removed by distillation in the presence of free chlorine and wherein the effluent vapor is contacted with activated carbon to remove excess free chlorine.

In the production of hydrochloric acid, particularly by the well known processes involving the double decomposition of common salt (NaCl) and sulfuric acid, impurities are introduced into the evolved hydrogen chloride. A large portion of these impurities is removed during washing and filtering of the hydrogen chloride but the more volatile ones persist and are absorbed in water along with the hydrogen chloride in the absorbers.

For example, arsenic which is usually present in the sulfuric acid is converted into arsenous chloride which because of its low boiling point is particularly persistent. Similarly, easily volatilized organic compounds originally present in the salt as well as organic matter which has been converted to easily volatilized compounds by the action of the sulfuric acid are carried over and absorbed together with the hydrogen chloride.

These arsenical and organic impurities, for the same reasons that they persist in the crude acid, cannot be readily and economically separated by distillation.

The fact that these impurities are present in the crude acid in minor amounts only, as well as the fact that the tolerances for them in chemically pure acid is inordinately small, further augments the difficulty of their removal. For example, arsenic which rarely exceeds one part per million in the crude acid must be reduced to less than one tenth part per million to meet the requirements of the American Chemical Society for chemically pure acid. Similarly the tolerance for organic matter in chemically pure acid is small because of the discoloration produced in the acid by traces of this impurity.

Altho it is known that arsenical and organic impurities may be removed from hydrochloric acid by distillation in the presence of an oxidizing agent, the process has the disadvantage that free chlorine, liberated by the action of the oxidizing agent on the hydrochloric acid, is carried over into the distillate. That this process has not been successfully adapted to commercial operation is due mainly to the difficulty of removing the excess free chlorine.

Many of the attempts to remove the chlorine have led to the introduction of additional impurities. For example, the use of acetylene or other unsaturated organic compounds has introduced chlorine derivatives. The acid is also frequently contaminated with the unsaturated compounds.

Other suggestions, such as fractional distillation, have proved suitable for small scale operations only. The intermittent character of this type of distillation makes it unsuitable for commercial operations. Furthermore the first fraction, that containing chlorine, is also the more concentrated one; thus the yield is materially impaired.

We have found that chemically pure hydrochloric acid can be made economically and effectively from crude acid, such as is obtained commercially by the decomposition of sulfuric acid and sodium chloride, by distilling the crude acid in the presence of an oxidizing agent and contacting the effluent hydrochloric acid vapor with activated carbon prior to condensation. In this manner we are able to process crude hydrochloric acid in a manner consistent with commercial operations; we are able to do so effectively and economically and in a continuous manner; we are able to produce acid in which the arsenic and organic contents are well below that specified for chemically pure acid, and; we are able to do so without introducing other impurities.

A still further economical advantage of our process resides in the fact that oxidizable sulfur compounds are also reduced to negligible amounts. This is of particular importance where the acid is to be used for sulfur determinations, because no correction for oxidizable sulfur compounds is necessary.

In the accompanying drawing, we have illustrated diagrammatically, an apparatus for purifying crude hydrochloric acid. The essential steps of our process, consisting briefly of treating the crude acid with an oxidizing agent, distilling the so-treated acid, and absorbing the free chlorine from the evolved vapors, are indicated.

The apparatus consists of a retort 1, an absorber 2, a header 3, and a condenser or series of condensers (not shown), the retort, the header, and the condensers being of conventional construction. The retort may be constructed and operated according to usual practice. Preferably, it should be designed for continuous distillation for reasons which will be apparent later. Briefly, operation in this manner consists in effecting a continuous flow of acid thru the retort, crude acid being introduced and the constant boiling residue being withdrawn at rates which will give a distillate of desired concentration. Suitable inlet and outlet means, such as indicated at 4 and 5, may be provided for this purpose.

Distillation of the crude acid is effected in the presence of free chlorine in order to oxidize the arsenical impurities to less volatile forms which are retained in the still residue, and to convert the organic impurities to non-volatile or non-condensible forms which are retained in the still residue or which escape to the atmosphere.

The chlorine may be introduced in several ways. It may be introduced as such, or it may be produced in the nascent state by adding an oxidizing agent to the acid. We have found, however, that the addition of an oxidizing agent, particularly in aqueous solution, is more economical and convenient. As oxidizing agents for this purpose are well known, it is sufficient to mention that among those which we have found particularly satisfactory are the alkali metal chlorates and permanganates and hydrogen peroxide.

The amount of oxidizing agent necessary to oxidize the impurities may be determined by gradually increasing the amount until free chlorine can be detected in the effluent vapors or in the residue. Once this amount is determined, it may be increased sufficiently to cover possible variations in the analysis of the crude acid and to provide an adequate margin for safe operation. Too much can only introduce more free chlorine whereas too little may result in imperfect elimination of the arsenic. A large excess should be avoided as it is unnecessary and would only have to be removed later.

More oxidizing agent is required for intermittent or batch-type distillation than for continuous distillation. Due to the fact that the free chlorine distills over with the first fraction, additional oxidizing agent must be added at intervals thruout the distillation to maintain oxidizing conditions. With continuous distillation, however, the oxidizing agent is continuously added with the crude acid so that oxidizing conditions are maintained without further additions. The latter process is particularly advantageous in that the excess of free chlorine is small.

As the distillation proceeds, the effluent vapor is treated to remove the free chlorine. We accomplish this by preferentially absorbing the free chlorine with activated carbon. Preferably, we employ activated carbon, such as "Magnachar" or "Darco," which is obtained from charcoal.

For this purpose we interpose an activated-charcoal absorber between the retort and the condenser. A suitable construction for this purpose is illustrated at 2 in the drawing, wherein the activated carbon is retained within a glass cylinder 6 by the perforated plates 7 and 8. This assembly is interposed between the retort 1 and the header 3 by means of the face plates 9 and 10, gas tight connection being provided by suitable gaskets. The assembly is removably associated with the face plates 9 and 10 so that it may be replaced easily when the activated carbon becomes saturated with chlorine.

The absorber preferably is arranged so that the effluent vapor passes upwardly thru it. In this manner, a refluxing action may be obtained assuring effective absorption of the chlorine. This arrangement additionally operates to prevent mist or other impurities entrained in the effluent vapors from being carried over into the distillate.

We have found that the absorber operates more efficiently if the temperature of the activated carbon does not materially exceed 120° C. At higher temperatures the useful life of the carbon is shortened. Particularly efficient operation is obtained within the temperature range of about 107° C. to 112° C. This temperature may be effectively maintained without auxiliary heating means by locating the absorber close to the vapor outlet of the retort and, if necessary, by heat insulating it. The temperature should not be permitted to drop much below the dew point as too much refluxing would occur.

The amount of carbon which may be employed is limited by the resistance it offers to the flow of the still vapors. If too much is employed the back pressure will be excessive. As the carbon must be replaced when it becomes saturated with chlorine, it is desirable to use as large an amount as practicable without unduly increasing the back pressure.

In order that the invention may be more fully understood the following examples are given:

Example I

A still was used consisting of a retort capable of handling five thousand pounds of crude acid per day, an absorber constructed of a twelve inch glass cylinder packed with six inches of "Magnachar" No. 50 activated carbon and a multiple condenser, the arrangement being similar to that illustrated in the flow sheet.

The crude acid used had the following average analysis:

Specific gravity_____degrees Baumé____ 22.06
Hydrogen chloride_____per cent____ 35.02
Arsenic_____part per million____ 0.14
Organic matter_____High The crude acid was treated with 0.005 per cent by weight of sodium chlorate ($NaClO_3$) in aqueous solution to provide an adequate excess of free chlorine.

The so treated crude acid was introduced into the retort and the constant boiling residue withdrawn at rates calculated to give a distillate of twenty-three (23) degrees Baumé. The temperature of the effluent vapor as it entered the absorber was 110° C.

Analyses taken at twenty-four hour intervals showed that the distillate had the following average analysis:

Specific gravity_____ 23.10 degrees Baumé.
Hydrogen chloride___ 37.36 per cent.
Arsenic _____ .006 part per million.
Sulphur compounds,
  less than_____ 0.05 part per million.
Organic matter_____ None to very faint trace.
Free chlorine_____ None.

The arsenic varied from .005 to .008 part per million and the organic matter from none to a barely detectable amount.

From these data it is evident that the process is capable of producing, on a commercial scale, pure hydrochloric acid containing no free chlorine and containing satisfactorily low concentrations of other impurities.

Example II

In another run, but on a smaller scale, 0.012% by weight of sodium chlorate was added to a crude acid at the same average analysis as used in Example I, the rate of flow thru the retort was such that the temperature of the effluent vapor was slightly less than 110° C., and the effluent vapor was led upwardly thru an absorber charged with "Columbia" Grade #4, 6-14 mesh, activated carbon.

Nine separate analyses taken during the run showed that the distillate had the following average analysis:

| | |
|---|---|
| Specific gravity_____degrees Baumé__ | 23.54 |
| Hydrogen chloride_____per cent__ | 38.35 |
| Arsenic_____part per million__ | 0.013 |
| Organic matter_____ | Very low |
| Free chlorine_____ | None |

The arsenic varied form 0.000 to 0.037 part per million; the organic matter from none to a barely detectable amount.

From these data it is evident that the grade of activated carbon used need not be limited to any specific grade.

We do not wish to be limited by the concentrations of crude or pure hydrochloric acid shown in these examples, as the concentrations used are normal trade concentrations. The process is applicable to consumption and production of less or more concentrated acid.

We claim:

1. The process for manufacturing chemically pure hydrochloric acid which comprises distilling crude aqueous hydrochloric acid in the presence of an oxidizing agent in a manner such that the effluent vapor contains a mixture of hydrochloric acid gas and water vapor in proportions to produce on condensation an acid of desired specific gravity and is contaminated with traces of free chlorine, contacting the effluent vapor substantially at atmospheric pressure with activated carbon at a temperature less than 120° C. and then cooling the effluent vapor sufficiently to condense the mixture of water vapor and hydrochloric acid gas.

2. The process for manufacturing chemically pure hydrochloric acid which comprises distilling crude aqueous hydrochloric acid in the presence of an oxidizing agent in a manner such that the effluent vapor contains a mixture of hydrochloric acid gas and water vapor in proportions to produce on condensation an acid of desired specific gravity and is contaminated with traces of free chlorine, passing the effluent vapor substantially at atmospheric pressure upwardly in contact with activated carbon at a temperature less than 120° C. and then cooling the effluent vapor sufficiently to condense the mixture of water vapor and hydrochloric acid gas.

3. The process for manufacturing chemically pure hydrochloric acid which comprises distilling crude aqueous hydrochloric acid in the presence of an oxidizing agent in a manner such that the effluent vapor contains a mixture of hydrochloric acid gas and water vapor in proportions to produce on condensation an acid of desired specific gravity and is contaminated with traces of free chlorine, contacting the effluent vapor substantially at atmospheric pressure with activated carbon at a temperature between 107° C. and 112° C. and then cooling the effluent vapor sufficiently to condense the mixture of water vapor and hydrochloric acid gas.

4. The process for manufacturing chemically pure hydrochloric acid which comprises distilling crude aqueous hydrochloric acid in the presence of an oxidizing agent in a manner such that the effluent vapor contains a mixture of hydrochloric acid gas and water vapor in proportions to produce on condensation an acid of desired specific gravity and is contaminated with traces of free chlorine, passing the effluent vapor substantially at atmospheric pressure upwardly in contact with activated carbon at a temperature between 107° C. and 112° C. and then cooling the effluent vapor sufficiently to condense the mixture of water vapor and hydrochloric acid gas.

5. The process of claim 1 further characterized in that the temperature of the effluent vapor contacting the activated carbon is substantially that of the dewpoint of the effluent vapor.

JAMES W. BROWN.
DONALD P. HILL.